(12) United States Patent
Pantring et al.

(10) Patent No.: US 9,527,376 B2
(45) Date of Patent: Dec. 27, 2016

(54) METHOD AND DEVICE FOR DETECTING A RUNNING INTERNAL COMBUSTION ENGINE IN A HYBRID VEHICLE

(75) Inventors: Juergen Pantring, Schwieberdingen (DE); Ruediger Weiss, Moetzingen (DE); Jean-Marc Tonye Djon, Stuttgart (DE); Armin Huber, Ostfildern (DE); Karsten Kroepke, Pudong New Area (CN)

(73) Assignee: Robert Bosch GmbH, Stuttgart (DE)

( * ) Notice: Subject to any disclaimer, the term of this patent is extended or adjusted under 35 U.S.C. 154(b) by 1269 days.

(21) Appl. No.: 12/737,668

(22) PCT Filed: Jul. 9, 2009

(86) PCT No.: PCT/EP2009/058748
§ 371 (c)(1),
(2), (4) Date: May 9, 2011

(87) PCT Pub. No.: WO2010/015483
PCT Pub. Date: Feb. 11, 2010

(65) Prior Publication Data
US 2011/0208401 A1 Aug. 25, 2011

(30) Foreign Application Priority Data
Aug. 7, 2008 (DE) .................. 10 2008 041 108

(51) Int. Cl.
*F01N 3/08* (2006.01)
*B60K 6/48* (2007.10)
(Continued)

(52) U.S. Cl.
CPC ............... *B60K 6/48* (2013.01); *B60W 10/08* (2013.01); *B60L 2240/441* (2013.01);
(Continued)

(58) Field of Classification Search
CPC ..... B60K 6/48; B60L 2240/441; B60W 10/08; B60W 20/00; B60W 2510/0638; Y02T 10/6221; F01N 2430/08; F02D 19/061; F02D 2200/1015
(Continued)

(56) References Cited

U.S. PATENT DOCUMENTS 6,691,669 B2 * 2/2004 Surnilla et al. .............. 123/295
8,091,538 B2 * 1/2012 Hartmann et al. ........... 123/690

FOREIGN PATENT DOCUMENTS

DE 10 2006 012 868 9/2007
EP 1 143 134 10/2001
(Continued)

*Primary Examiner* — Hung Q Nguyen
*Assistant Examiner* — Gonzalo Laguarda
(74) *Attorney, Agent, or Firm* — Norton Rose Fulbright US LLP; Gerard Messina

(57) ABSTRACT

In a method for detecting a running internal combustion engine in a hybrid vehicle, the internal combustion engine, as a first drive unit, and a second drive unit contribute toward driving the hybrid vehicle. To determine reliably whether the internal combustion engine is running during hybrid operation, an interference signal is actively introduced into the ongoing operating sequence of the internal combustion engine, and the response of the internal combustion engine to this interference signal is evaluated. If there is no response of the internal combustion engine, it is concluded that the internal combustion engine is not operating.

8 Claims, 3 Drawing Sheets

(51) Int. Cl.
*B60W 10/08* (2006.01)
*B60W 20/00* (2016.01)
(52) U.S. Cl.
CPC ..... *B60W 20/00* (2013.01); *B60W 2510/0638* (2013.01); *Y02T 10/6221* (2013.01)
(58) Field of Classification Search
USPC . 701/22, 99, 101, 102, 111, 114; 180/65.21, 65.28, 65.265, 65.285; 73/114.01–114.04
See application file for complete search history.

(56) References Cited

FOREIGN PATENT DOCUMENTS

| EP | 1 750 111 | 2/2007 | | |
|---|---|---|---|---|
| EP | 1 852 594 | 11/2007 | | |
| EP | 1852594 A1 | * | 11/2007 | ............. B60K 6/445 |

* cited by examiner

METHOD AND DEVICE FOR DETECTING A RUNNING INTERNAL COMBUSTION ENGINE IN A HYBRID VEHICLE

BACKGROUND OF THE INVENTION

1. Field of the Invention

The present invention relates to a method for detecting a running internal combustion engine in a combustion engine as the first drive unit and a second drive unit make a contribution toward driving the hybrid vehicle and a device for performing the method.

2. Description of the Related Art

Vehicles having a hybrid drive structure have an internal combustion engine and usually an electric motor as the second drive unit. The drive torque during driving operation of the hybrid vehicle may therefore be applied by both drive units.

If errors occur in the internal combustion engine, they are manifested by misfiring on the cylinders of the internal combustion engine.

Constant misfiring on all the cylinders of the internal combustion engine is not noticed further in a hybrid vehicle because the second drive unit continues to ensure the driving operation of the hybrid vehicle. Constant misfiring on all cylinders is not detected by known irregular running methods because the irregular running is optimal. The segment time of all cylinders is of the same length.

Published German patent application document DE 10 2006 012 868 A1 describes a method for diagnosing misfiring of an internal combustion engine which is situated together with an electric motor in a hybrid vehicle. The signals of the control of the internal combustion engine are coupled with the signals of the electric motor, so that a diagnosis of the internal combustion engine with regard to the occurrence of combustion misfiring may be performed with the aid of a vibration analysis using these signals.

BRIEF SUMMARY OF THE INVENTION

The method according to the present invention for detecting a running internal combustion engine in a hybrid vehicle has the advantage that an internal combustion engine that is misfiring on all cylinders may be detected without any additional components, thereby enabling a very inexpensive analysis of the performance of the internal combustion engine. An interference signal is actively introduced into the ongoing operating sequence of the internal combustion engine by an engine control unit present per se, which controls and regulates the operation of the internal combustion engine and analyzes the response of the internal combustion engine to this interference signal. If there is no response of the internal combustion engine to the interference signal, it is then concluded that the internal combustion engine is not operating.

In a refinement of the present invention, at least one combustion parameter of the internal combustion engine is modified, and irregular running of the internal combustion engine is monitored. If there is no change in irregular running due to the change in the combustion parameter, it is concluded that constant misfiring is occurring on all cylinders of the internal combustion engine. Greater irregular running is forced by the active change in the combustion parameter of the internal combustion engine and is then analyzed. If the internal combustion engine is not running independently, as is the case with constant misfiring on all cylinders, the internal combustion engine will not respond to the change in the combustion parameters. This means that increased irregular running activities are not detectable, which is thus detected as an error.

In an additional variant, the interference variable is increased. Thus additional certainty that no combustion is taking place is achieved. This prevents early unjustified shutdown of the injection. By using this simple diagnostic method, the internal combustion engine may be shut down immediately to prevent unburned fuel from reaching the hot catalytic converter.

The firing angle of at least one cylinder of the internal combustion engine is advantageously adjusted actively as a combustion parameter. An active adjustment of the firing angle is easily and quickly possible. This makes it possible to limit the influence on a worsening of the exhaust gas due to the adjustment range.

To ensure overall neutrality with regard to the drive torque of the hybrid vehicle, the firing angles of the cylinders are adjusted in such a way that delayed firing occurs in a predefined number of cylinders, whereas early firing occurs in an equal number of cylinders. This short-term unequal adjustment of the drive torques of the individual cylinders results in an increase in the irregular running in a running internal combustion engine. If this irregular running occurs, the internal combustion engine is detected as running, but if this irregular running does not occur, the internal combustion engine is inactive.

To obtain a reliable and secure result, the adjustment of the firing angle is repeated several times.

An injection quantity is adjusted briefly as the combustion parameter to achieve the altered irregular running.

In another embodiment of the present invention, a device for detecting a running internal combustion engine in a hybrid vehicle includes an internal combustion engine and a second drive unit, the internal combustion engine as the first drive unit and the second drive unit jointly making a contribution toward driving the hybrid vehicle. To reliably determine whether the internal combustion engine is running during hybrid operation of the vehicle, means are provided which actively introduce an interference signal into the ongoing operating sequence of the internal combustion engine and analyze the response of the internal combustion engine to this interference signal, so that if there is no response of the internal combustion engine to the interference signal, it is then concluded that the internal combustion engine is not operating. Such an interference signal may be generated easily by a change in the software in the engine control unit, so that the malfunction of the internal combustion engine is detected without requiring any additional components.

In one embodiment of the present invention, the means change at least one combustion parameter of the internal combustion engine and monitor irregular running of the internal combustion engine. If there is no change in the irregular running, it is concluded that constant misfiring is occurring on all cylinders of the internal combustion engine. If the internal combustion engine does not respond to the change in the combustion parameter, this is detected as an error and it is established that the internal combustion engine is not operating.

In a simple and particularly inexpensive embodiment, the irregular running of the internal combustion engine is monitored by a rotational speed sensor.

DETAILED DESCRIPTION OF THE INVENTION

Figure 1:
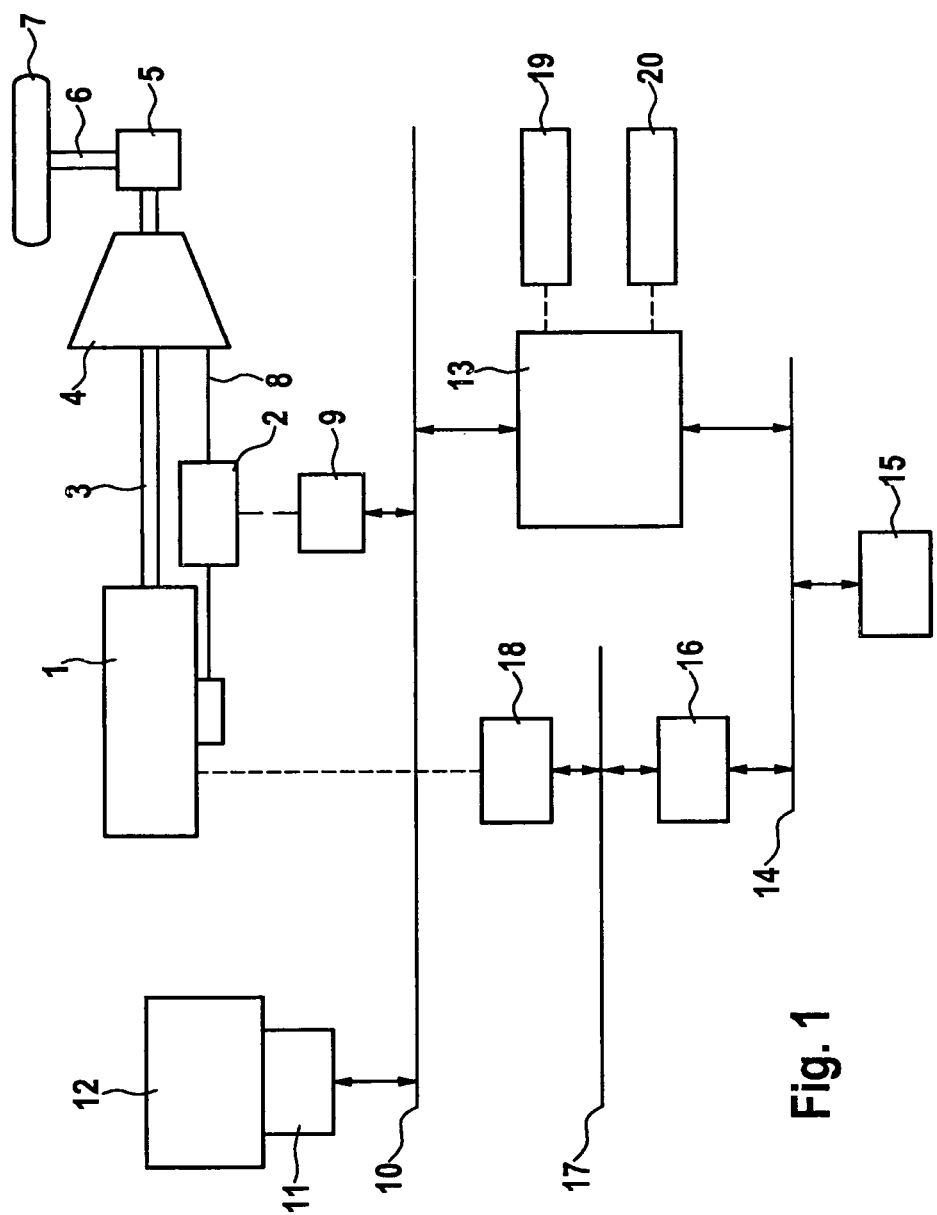
FIG. 1 shows a schematic diagram of a motor vehicle having a hybrid drive.

FIG. 1 shows a schematic diagram of a vehicle having a hybrid drive. The hybrid drive is formed by an internal combustion engine 1 as the first drive unit and an electric motor 2 as the second drive unit.

Internal combustion engine 1, a four-cycle gasoline engine in this case, is connected via drive train 3 to transmission 4, which in turn leads via differential 5 to wheel axle 6 for driving wheel 7.

Electric motor 2 is connected to transmission 4 via a separate drive train 8 and thus contributes toward driving wheels 7 and to the total torque of the vehicle. In addition, electric motor 2 has its own electric motor control unit 9, which is connected to a hybrid CAN bus 10 via which all the control units, which have an influence on the hybrid-specific driving operation of the vehicle, communicate with one another. These include, among others, battery management system 11 of high-voltage battery 12. High-voltage battery 12 is connected to electric motor 2 and supplies it with electric power.

A vehicle control unit 13 communicates via the CAN bus with electric motor control unit 9, which is connected to hybrid CAN bus 10, and also with battery management system 11. In addition, it is connected via CAN bus 14, among others, to an ESP control unit 15 and other control units (not shown) of the vehicle safety and driver assistance systems of the vehicle.

CAN bus 14 is connected via a gateway 16 to a gateway CAN bus 17, via which the individual bus systems of the vehicle communicate with one another.

Engine control unit 18 of internal combustion engine 1 is connected to vehicle control unit 13 via gateway CAN bus 17 and CAN bus 14.

Vehicle control unit 13 is connected to rotational speed sensors 19 and 20, from which vehicle control unit 13 receives information about the instantaneous operating parameters of the vehicle operation.

In the present configuration, the torque relevant for the drive is applied by internal combustion engine 1 and also by electric motor 2.

Figure 2:
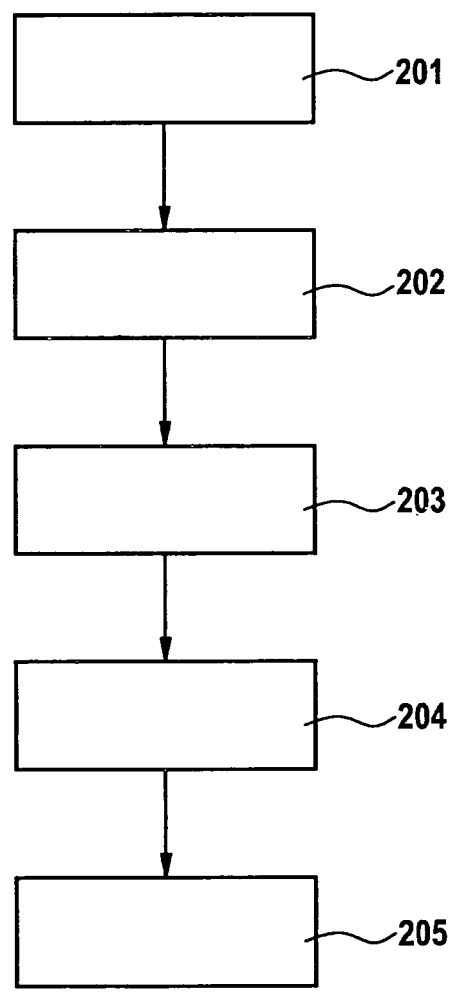
FIG. 2 shows a schematic flow chart of an exemplary embodiment of the method according to the present invention.

One possible specific embodiment of the present invention will now be explained on the basis of FIG. 2, with the aid of which it is to be established whether internal combustion engine 1 is in operation and is making a contribution toward driving the hybrid vehicle.

In block 201, it is assumed that after starting the engine, internal combustion engine 1 and electric motor 2 are both in operation and both are delivering a drive torque to the hybrid vehicle.

In block 202, the firing angle of internal combustion engine 1 is actively adjusted by engine control unit 18. Internal combustion engine 1 has four cylinders, two cylinders of which are adjusted in such a way that firing occurs later than in the normal case (optimal firing angle), which means that only a limited drive torque is delivered to the vehicle by these two cylinders. The two remaining cylinders are adjusted in such a way that the firing is advanced, thus resulting in a greater drive torque being delivered to the vehicle. With regard to the drive torque, a certain neutrality is achieved by the adjustment of the firing angle on the four cylinders as described here, so that the adjustment of the firing angle is not detectable in the driving performance of the vehicle.

In block 203, there is monitoring of whether this short-term unequal adjustment of the torques of the four individual cylinders will result in an increase in the irregular running of internal combustion engine 1, which is measured by rotational speed sensor 19 and relayed to engine control unit 18. The irregular running is manifested in a rotational speed signal that is not entirely uniform.

In block 204, engine control unit 18 evaluates the results of the rotational speed measurement on internal combustion engine 1. If the irregular running of internal combustion engine 1 increases due to the firing angle adjustment, which means that the vibration amplitude of internal combustion engine 1 becomes greater, as shown in FIG. 3, then it is assumed that internal combustion engine 1 is active and at least one cylinder is operating without misfiring.

However, if the rotational speed measurement remains constant after the adjustment of the firing angle, it is then recognized that there is an error and that internal combustion engine 1 is not operating, which is equivalent to having constant misfiring on all cylinders.

If such an error is detected, the internal combustion engine is shut down in block 205.

Figure 3:
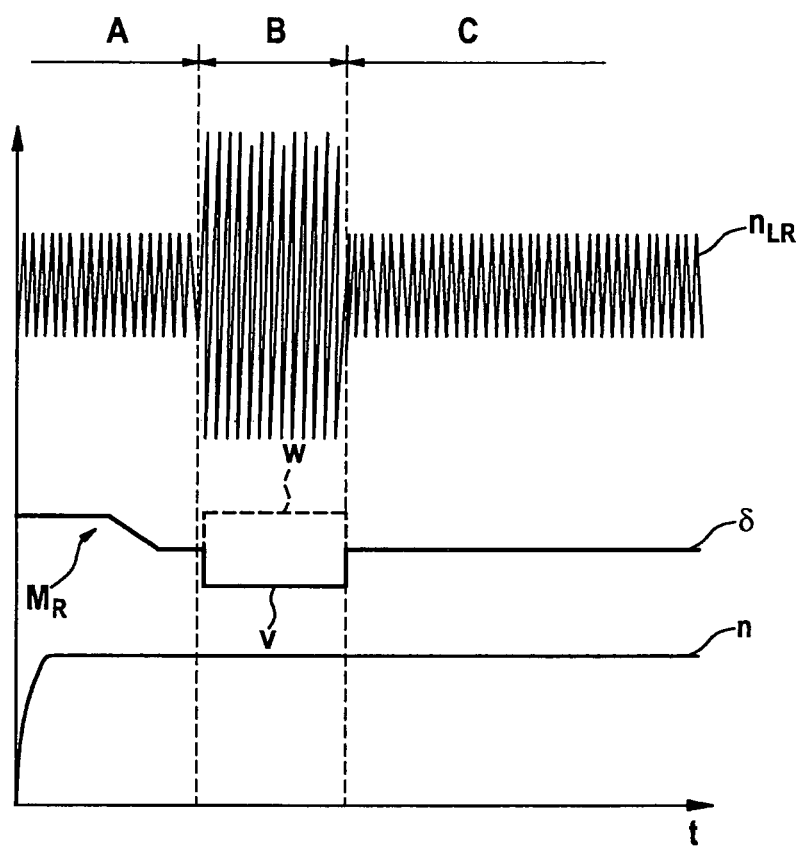
FIG. 3 shows a diagram of the irregular running as a function of the firing angle and the time.

FIG. 3 shows irregular running $n_{LR}$ of internal combustion engine 1 detected by the rotational speed measurement in the upper diagram. The middle diagram shows firing angle δ and the bottom diagram shows rotational speed n as displayed for the driver by a tachometer in the motor vehicle. All three diagrams are plotted as a function of time t.

At the point in time of the start of internal combustion engine 1, irregular running in the form of the rotational speed has an approximately constant average value $n_{LR}$ in range A. In the case of firing angle δ a reserve torque $M_R$ is built up in the same range A to achieve an increase in torque even before activation of the function by advancing the firing. Rotational speed n, which is displayed for the driver, stabilizes at a constant level after the start.

In range B two cylinders are retarded (curve v), as described, and two cylinders are advanced (curve w). This unequal adjustment of the torques of the individual cylinders results in an increase in the irregular running of the engine, i.e., rotational speed $n_{LR}$. If such an increase occurs, the internal combustion engine is active.

After the active change in the firing angle, operation returns to the normal operating state of internal combustion engine 1 in range C.

The driver does not perceive this irregular running in the rotational speed displayed for him.

What is claimed is:

1. A method for detecting the operating status of an internal combustion engine in a hybrid vehicle, the hybrid vehicle having the internal combustion engine as a first drive unit and also having a second drive unit, the method comprising:

actively introducing a selected interference signal into an operation sequence of the internal combustion engine;

evaluating a response of the internal combustion engine to the selected interference signal; and determining that the internal combustion engine is not operating if no response of the internal combustion engine to the selected interference signal is detected;

wherein at least one combustion parameter of the internal combustion engine is modified and an irregular running of the internal combustion engine is monitored, and wherein if no change in the irregular running is detected in response to the change in the combustion parameter, determining that constant misfiring is occurring on all cylinders of the internal combustion engine.

2. The method as recited in claim 1, wherein the firing angle of at least one cylinder of the internal combustion engine is actively adjusted as the combustion parameter.

3. The method as recited in claim 2, wherein the firing angle of the at least one cylinder is adjusted in such a way that delayed firing occurs in a predefined number of cylinders and early firing occurs in equal number of cylinders as the predefined number of cylinders.

4. The method as recited in claim 3, wherein the adjustment of the firing angle is repeated multiple times.

5. The method as recited in claim 1, wherein an injection quantity is adjusted as the combustion parameter.

6. The method as recited in claim 1, further comprising:
one of (i) amplifying the interference signal or (ii) increasing the frequency of occurrence of the interference signal.

7. A control unit for detecting the operating status of an internal combustion engine in a hybrid vehicle, the hybrid vehicle having the internal combustion engine as a first drive unit and also having a second drive unit, comprising:
means for actively introducing a selected interference signal into an operation sequence of the internal combustion engine and evaluating the response of the internal combustion engine to the interference signal such that if there is no response of the internal combustion engine, the internal combustion engine is not operating;
wherein the means change for at least one combustion parameter of the internal combustion engine and monitor irregular running of the internal combustion engine, such that if there is no change in the irregular running, constant misfiring is occurring on all cylinders of the internal combustion engine.

8. The device as recited in claim 7, wherein the means for evaluating the response of the internal combustion engine to the selected interference signal includes a rotational speed sensor for monitoring the irregular running of the internal combustion engine.

* * * * *